United States Patent [19]

Hurlburt et al.

[11] 3,810,517
[45] May 14, 1974

[54] LOADER DRIVE

[75] Inventors: Joseph C. Hurlburt, Leola; Lawrence M. Halls, New Holland, both of Pa.

[73] Assignee: Sperry Rand Corporation, New Holland, Pa.

[22] Filed: Dec. 30, 1971

[21] Appl. No.: 214,038

[52] U.S. Cl.................................. 180/49, 74/242.8
[51] Int. Cl.............................................. B66f 9/00
[58] Field of Search..................... 180/24.05, 49, 72; 74/242.14, 242.15

[56] References Cited
UNITED STATES PATENTS

| | | | |
|---|---|---|---|
| 3,635,365 | 1/1972 | Bauer............................ | 180/6.48 X |
| 1,751,394 | 3/1930 | Christie ........................ | 180/24.0 S |
| 2,479,617 | 8/1949 | Hawley et al. ................ | 74/242.15 R |
| 2,800,972 | 7/1957 | Jacobson et al. .............. | 180/49 X |

Primary Examiner—Frank E. Werner
Attorney, Agent, or Firm—Frank A. Seemar; John R. Flanagan; Joseph A. Brown

[57] ABSTRACT

A simplified final drive system for a four wheel drive skid steer tractor vehicle. Generally, the basic structure of the final drive of the present invention comprises a single drive chain trained around a pair of spaced apart wheel sprockets, a drive sprocket and back wrapped around an idler sprocket, said sprockets and single chain being housed within a chain casing containing a lubricant solution. The idler sprocket is rotatively mounted about an idler mount which itself is pivotally mounted within said chain casing and operatively connected to an adjusting mechanism disposed exteriorly of said chain casing, thereby enabling the tension of the chain to be adjusted without opening the chain case.

7 Claims, 10 Drawing Figures

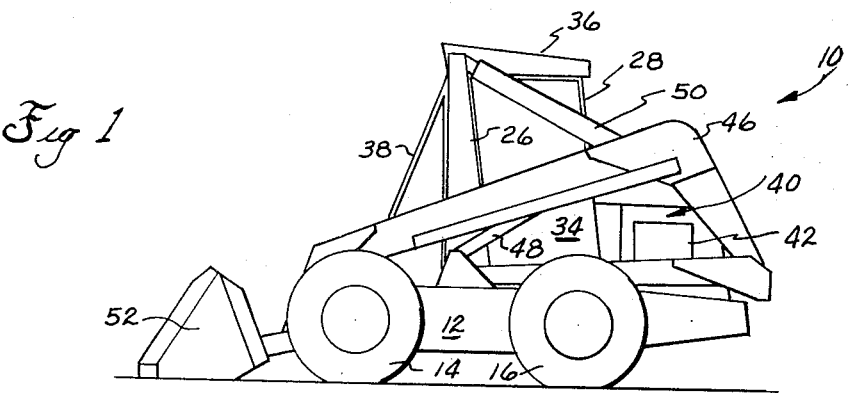
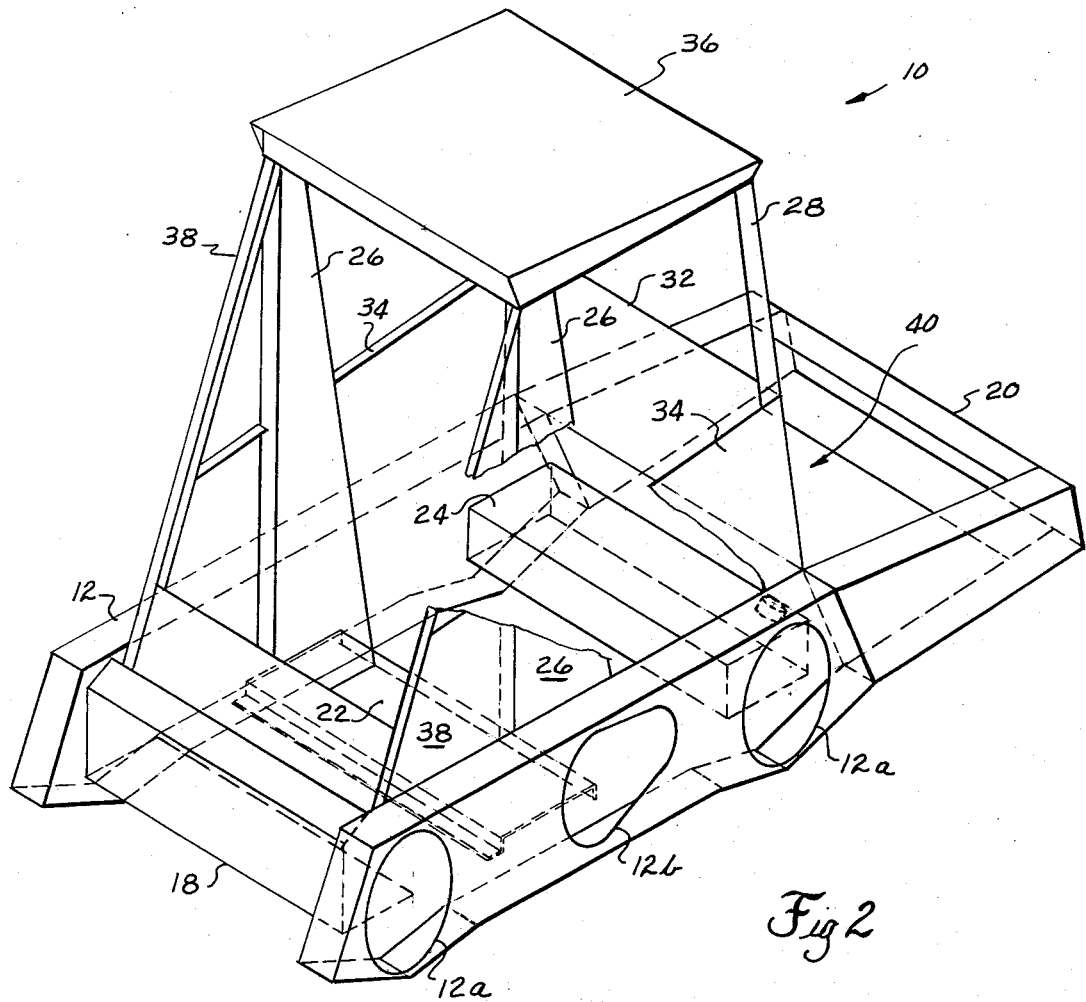

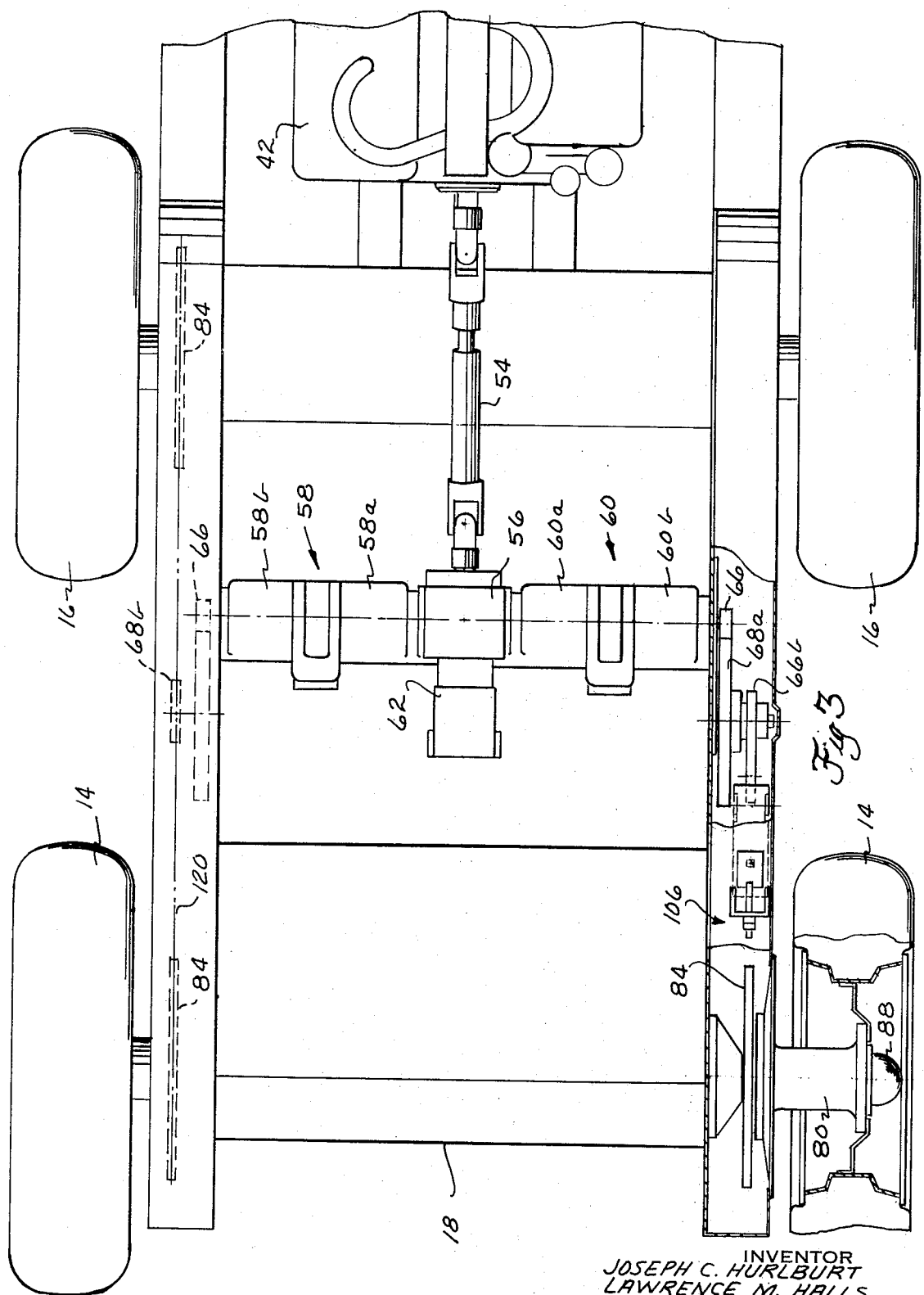

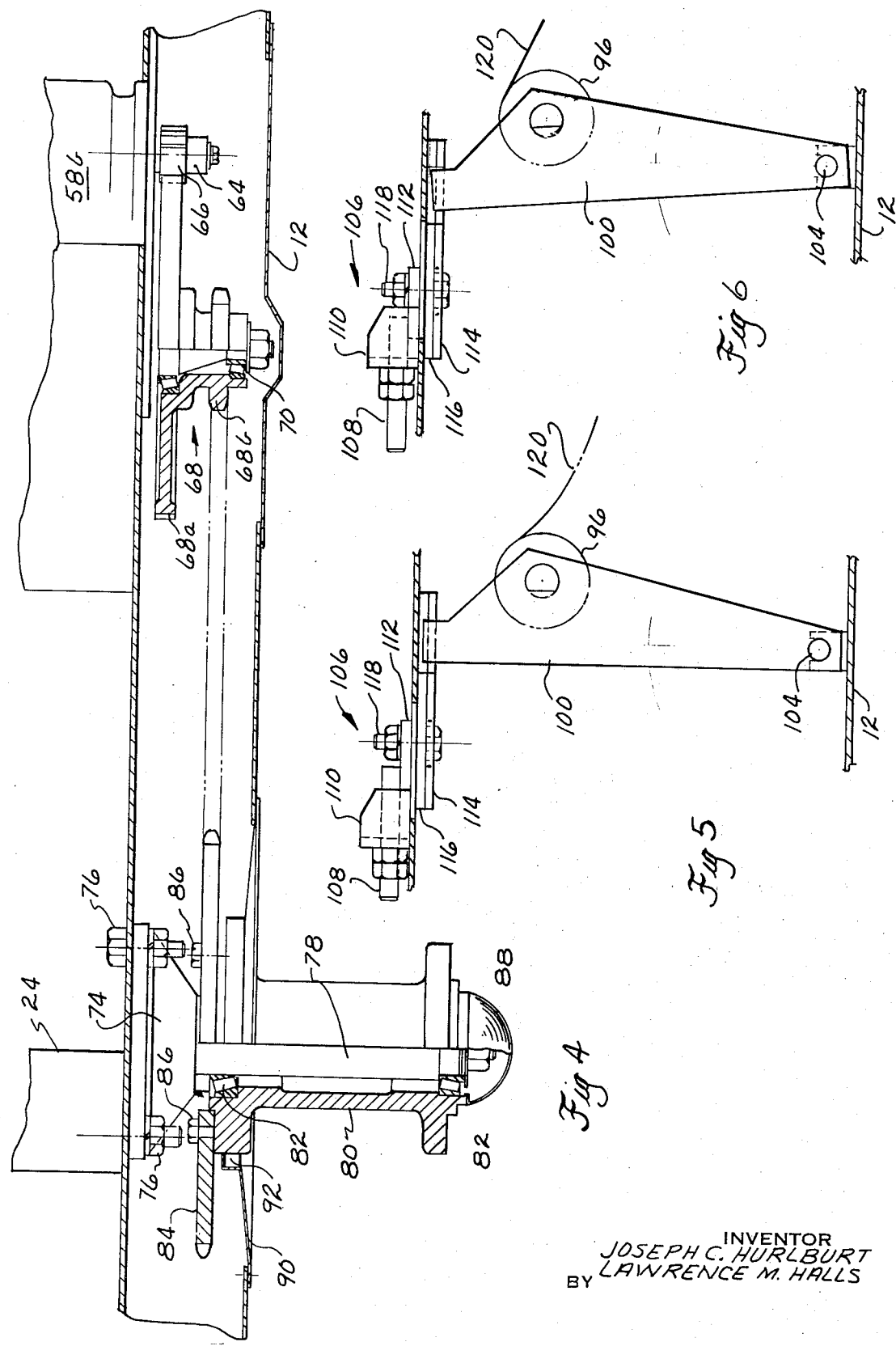

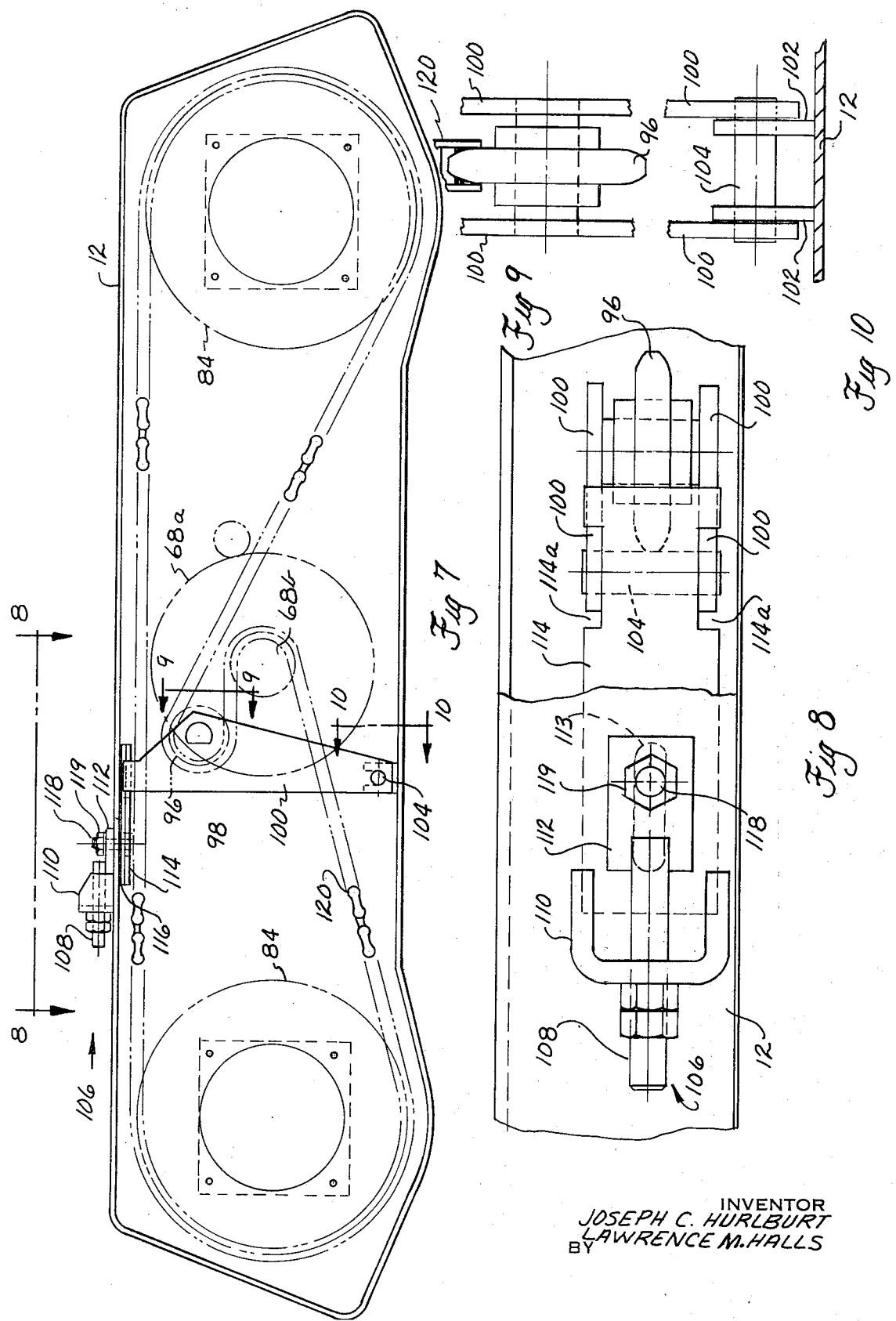

LOADER DRIVE

BACKGROUND OF THE INVENTION

The present invention relates to tractor vehicles such as loaders and the like, and more particularly to the final drive thereof.

The disclosure found in U.S. Pat. No. 3,231,117, granted to C. E. Melroe et al. on Jan. 25, 1966 typlifies the state of the art and design of final drive systems in industrial vehicles, especially the four wheel drive skid steer type. In the Melroe patent (FIG. 4) it will be noted that the final drive system shown therein entails the use of two separate chains, each chain trained around one wheel sprocket and a separate drive sprocket. Thus, the final drive system of the Melore type, and others which employed this dual chain approach, requires duplicate parts, giving rise to greater cost and space requirement, and a more complex design which, of course, requires more frequent repairs and complicates service and maintenance.

Also, it is well appreciated that a chain encounters a degree of wear from long hours of operation, resulting in the chain stretching and becoming loosely held around the particular sprockets involved. Therefore, to counter this wear problem and to compensate for the slack arising from the chain stretching, it is desirable to provide the final drive chain with means to maintain the chain in a taut position. Maintaining the final drive chain taut is extremely important in drive systems that require the chain to reverse, or which require the chain to carry pulsating loads, because of the jerking involved in starting and stopping, or reversing the drive of the chain.

SUMMARY OF THE INVENTION

In view of the above, applicants have devised a simplified final drive, the basic structure of which comprises only a single chain trained around a pair of wheel sprockets and a drive sprocket while back wrapped around an idler sprocket, all sprockets and single chain housed within a chain casing. The idler sprocket is rotatably mounted on a swinging idler mount, the idler mount being operatively connected to an adjusting mechanism disposed exteriorly of the chain casing, thereby allowing an operator or serviceman to adjust the tension of the single chain quickly and easily without having to open the chain case.

It is therefore the principle object of the present invention to provide a very simple final chain drive that is relatively inexpensive and lends itself to long and continuous service without requiring frequent servicing and maintenance.

Another object of the present invention is to provide a means for maintaining the chain drive in a relatively taut position while in operation, and to further provide means for selectively adjusting the tension of said final chain drive without requiring intrusion into a chain case which contains a lubricant solution for bathing the final chain drive.

A further object of the present invention lies in the provision of a final chain drive that entails the employment of a single chain to drive two spaced apart wheel sprockets, and the provision of an idler sprocket adjacent a drive sprocket such that said single chain may be wrapped more fully around the drive sprocket thereby providing substantial chain engagement with all sprockets such that driving torque applied to said drive sprocket may be readily transferred to said wheel sprockets for driving a pair of wheels.

Another object of the present invention lies in the provision of an idler sprocket for the final chain drive of a tractor vehicle and to provide that idler sprocket with means for selectively adjusting the tension of the chain drive such that the chain is always maintained relatively taut, thereby avoiding the undesirable jerking and extreme wear that is commonly associated with slack drive chains.

More particularly, it is the object of the present invention to provide a means for maintaining a final chain drive relatively taut and to particularly provide an adjusting mechanism operatively connected to said tensioning means that is disposed exteriorly of a chain case that houses said final chain drive, such that an operator may gain quick access to the adjusting mechanism without having to intrude into said chain case.

Another particular object of the present invention lies in the provision of a draw bolt and block assembly disposed exteriorly of a chain case and operatively connected to a swinging idler mount that carries a rotatable idler sprocket thereon engaged with a chain drive, such that the adjustment of said draw bolt against said block causes the idler mount to swing and the tension of the chain to be adjusted.

Other objects and advantages of the present invention will become apparent and obvious from a study of the following description and the accompanying drawings which are merely illustrative of the present invention.

BRIEF DESCRIPTION OF THE DRAWINGS

FIG. 1 is a side elevational view of an industrial loader of the type which lends itself to the adaptation of the drive system disclosed herein.

FIG. 2 is a perspective frame assembly drawing of the loader shown in FIG. 1.

FIG. 3 is a plan view illustrating the primary and final drive systems for the loader referred to above.

FIG. 4 is a fragmentary plan view of the final drive systems, with portions cut away and shown in section for clarity.

FIGS. 5 and 6 are fragmentary side elevational views of the chain tension adjusting mechanism of the present invention.

FIG. 7 is a side elevational view of the final chain drive for the loader vehicle referred to above.

FIG. 8 is a fragmentary plan view of the chain tension adjusting mechanism of the present invention.

FIG. 9 is a view taken along the line 9—9 of FIG. 7.

FIG. 10 is a view taken along the line 10—10 of FIG. 7.

DESCRIPTION OF THE PREFERRED EMBODIMENT

With reference to the drawings, particularly FIGS. 1 and 2, a front end loader, of the industrial type, is shown therein and indicated generally by the numeral 10. The main body frame of the loader 10 comprises a pair of laterally spaced, generally elongated chain casings 12. The chain casings 12, as will be discussed subsequently, house a final chain drive, and therefore are adapted to contain a lubricant solution therein. It will be observed from FIG. 2 that each chain casing 12 includes a pair of longitudinally spaced apart wheel assembly openings 12a and a general access opening 12b spaced between the wheel assembly openings. As seen in FIG. 1, front and rear wheels 14,16 extend outwardly from the wheel assembly openings 12a formed within the chain casings 12. To form a unitary chassis structure front and rear panel structures 18,20 are welded, or secured by other suitable means, between corresponding front and rear points of the chain casings 12. Added support is given to this chassis structure by the weldment of a floor plate 22 rearwardly of the front panel member 18.

The chassis structure is given further strength by securing a hydraulic system oil reservoir 24 between corresponding portions of the chain casing, intermediately between the floor plate 22 and the rear structural panel 20. This oil reservoir 24 is fabricated of relatively mild strength steel and, besides functioning as a reservoir, also serves the unique function of being a structural member of the chassis structure.

Continuing to particularly refer to the loader frame assembly drawing of FIG. 2, it will be noted that a pair of tapered upstanding posts 26 are welded, or secured by other suitable means, to the chain casings 12 and extend upwardly therefrom. In similar manner, a pair of rear posts 28 are likewise fixed to the chain casings 12 and extend upwardly therefrom where the upper portions thereof terminate at approximately the level of the upper terminal ends of the front posts 26. Secured to the top portion of the front and rear posts 26,28, respectively is a roof structure 36. Disposed adjacent and to the front of each front post 26 is a side A-frame panal structure 38.

An operator's station is formed by the provision of side sheets 34 extending generally between the front and rear posts 26,28 respectively and a back wall 32 extending transversely between the rear posts 28. It is seen from FIGS. 1 and 2 that this particular structural arrangement for the main body frame defines an engine compartment 40 about the rear of the frame structure, and that the general overall construction of the main frame structure lends itself to a compact, sturdy and economical frame design for an industrial tractor vehicle.

Turning briefly to the boom structure of the present industrial loader shown in FIG. 1, it will be observed that this boom structure comprises a pair of lower boom arms 44 pivotally connected to corresponding points on each side of the loader and extending generally rearwardly therefrom. Pivotally connected to the rearmost portion of the lower boom arms 44 is a pair of laterally spaced upper boom arms 46 that generally extend upward and then bend towards the forward portion of the loader, and include a front pivotally mounted material handling implement 52 which, in the present case, is a bucket. The upper boom arms 46 are powered by a pair of hydraulic cylinders 48, each hydraulic cylinder being anchored to the main frame structure and having its rod end connected to a rear portion of the upper boom arms 46. To give this boom structure appreciable reach when lifted, a pair of guide links 50 are provided, each guide link being interconnected between an upper portion of a front post 26 and a rear portion of a respective upper boom arm 46. A more detailed appreciation and understanding of the boom linkage structure shown herein may be gained from a study of U.S. Pat. No. 3,215,292 to L. M. Halls, assigned to the present assignee, New Holland Division of Sperry Rand Corporation.

With reference to FIG. 3, it will be noted that the primary drive system of the loader 10 generally comprises a universal drive shaft 54 drivingly interconnected between the loader's engine 42 and a right angled gearbox 56. It will be noted that the right angle gearbox 56 drives right and left-hand hydrostatic transmissions indicated generally by the numerals 58,60 respectively, and a supplementary hydraulic pump 62 that is used for various functions such as charging and cooling the hydrostatic transmissions. Although a detailed structural drawing of the hydrostatic transmissions 58 and 60 is not shown since such is not considered material to the present invention, let it suffice to say that each hydrostatic transmission is identical and basically comprise a hydrostatic pump 58a,60a and a hydrostatic motor 58b,60b, each pump and motor preferably being of the piston type. The manner of controlling the oil flow through the pumps and motors is likewise not particularly shown, but it is noted that each transmission may be controlled by a simple hand actuated lever appropriately linked to the pintle shaft of the respective pump of that transmission.

Each hydrostatic motor 58b,60b includes an output shaft 64, as best seen in FIG. 4. The output shaft 64 includes a pinion gear 66 fixed thereto which is engaged with a gear and sprocket casting, indicated generally by numerals 68, journalled on a drive sprocket shaft 70. Viewing the gear and sprocket casting 68 in detail, it will be seen from FIG. 4 that the gear and sprocket casting includes a reduction gear 68a meshed with the pinion gear 66 and an outwardly spaced drive sprocket 68b. It will be further noted that the gear and sprocket casting 68 is journalled by bearings 72 on the drive shaft 70 and freely rotatable thereon.

Also shown in FIG. 4 is a detail view of a respective wheel assembly, all four wheel assemblies of the present loader being identical. With particular reference to the wheel assembly shown in FIG. 4, it can be seen that a base plate 74 is fixed to the inside of chain casing 12 by a series of bolt and nut assemblies 76. The base plate 74 includes an annular opening therein for receiving an end portion of a main shaft 78, the shaft 78 being welded to the base plate 74, thereby being relegated to a stationary position. Spaced outwardly on said shaft 78 and journalled thereon for rotation by a pair of transversely spaced tapered bearing assemblies 82 is a rotatable hub 80. Each hub 80 includes a driven sprocket 86 fixed to an inner end thereof by another series of bolt and nut assemblies 86. The outer portion of the hub 80 includes a series of openings circumferentially disposed therearound for receiving a wheel thereon. Also it is seen from FIG. 4 that a hub cap 88 is provided for each wheel assembly.

Now referring to FIGS. 5-10, it will be seen that an idler sprocket 96 is spaced from said drive sprocket 68b. Said idler sprocket 96 is rotatively mounted on an idler mount means indicated generally by the numeral 98. It will be seen from FIGS. 9 and 10 that the idler mount means 98 includes a pair of laterally spaced generally upstanding arms 100, the arms being pivotally mounted to a pair of mounting tabs 102 fixed to the bottom portion of the chain casing 12 by a pivot pin 104 (FIG. 10). As just pointed out, the arms 100 are pivotally mounted, thereby giving rise to bodily movement for the idler sprocket 96 when the arms 100 are pivoted.

To swing the idler mount means 98 about the pivot pin 104, an adjusting mechanism is provided exteriorly of the chain casing 12. Specifically the adjusting mechanism, indicated generally by numeral 106, comprises a draw bolt 108 and block assembly 110. As best seen in FIGS. 7 and 8, an upper plate 112 is fixed to said draw bolt 108 and is generally disposed along the top of the wheel casing 12. The upper plate 112 includes a hole for receiving a stud 118 that extends trough an elongated slot 113 in the casing 12 and, an oil gasket 116 from lower plate 114. The stud 118 is provided with a nut 119 for firmly locking both the upper plate 112 and lower plate 114 firmly in place on opposite sides of the top portion of the chain casing 12. It will be further appreciated that the lower plate 114 includes a pair of U-shaped cut-outs 114a (FIG. 8) for receiving the top portions of the idler mount arms 100. Thus, by unlocking the stud and nut assembly 118,119 and adjusting the draw bolt 108, the lower plate 114 can be shifted fore-and-aft along the lower side of the upper portion of the chain casing 12, causing the idler arms 100 to swing back and forth, thereby imparting bodily movement to the idler sprocket 96.

As particularly seen in FIG. 7, the final aspect of the present invention concerns itself with the provision of a single final chain drive for transferring the torque delivered to the drive sprocket 68b to the laterally spaced apart driven sprockets 84. It will be observed that the driven sprockets 84, drive sprockets 68b, and idler sprocket 96 are all longitudinally aligned for accommodating a single drive chain 120. Also, it will be noted that this single drive chain 120 is trained around a substantial portion of the teeth of the driven sprockets 84 and to assure sufficient engagement with the drive sprocket 68b, the chain 120 is wrapped around the drive sprocket 68b with the aid of the back wrapped idler sprocket 96. Thus, it is seen that the present invention gives a very simplified final chain drive inasmuch as only one chain is used to drive two spaced apart wheel assemblies from a common drive source, without the use of duplicating parts in the form of two chains and two drive sprockets.

Also, the chain slack problem that is commonly associated with final drives of the prior art is not present in the design shown herein. To compensate for chain wear and stretching, the idler sprocket 96 is mounted on an adjustable idler mount means 98. To adjust the tensioning of the final drive chain 120 is a very simple matter in that the adjusting mechanism 106 is disposed exteriorly of the chain case 12 and allows the operator or serviceman to quickly and conveniently adjust without having to open the chain case. To quickly adjust the chain tension, it becomes a matter of loosening the locking nut 119 threaded on the sutd 118. Then the operator or serviceman simply screws the nut on the draw bolt 108 in either direction relative to the locking block 110 until the proper chain tension is reached. Once the proper chain tension is reached, the locking nut 119 is firmly tightened on the locking stud 118 and the chain tension adjustment is complete.

The terms, "upper," "lower," "forward," "rearward" etc. have been used herein merely for the convenience of the foregoing specification and in the appended claims to describe the loader drive and its parts as oriented in the drawings. It is to be understood, however, that these terms are in no way limiting to the invention since the loader drive may obviously be disposed in many different positions when in actual use.

The present invention, of course, may be carried out in other specific ways than those herein set forth without departing from the spirit and essential characteristics of the invention. The present invention are, therefore, to be considered in all respects as illustrative and not restrictive, and all changes coming within the meaning and equivalency range are intended to be embraced herein.

Having thus described our invention, what we claim is:

1. In a vehicle having a main body frame, an engine mounted within said main body frame, a pair of longitudinally spaced wheels on each side of said main frame, a drive system for driving each pair of longitudinally spaced wheels on respective sides of said main body frame, said drive system for each pair of wheels comprising:
   a chain casing disposed about one side of said main body frames;
   a pair of longitudinally spaced axle assemblies mounted within said chain casing and extending outwardly therefrom and having a wheel rotatively mounted about the outer portions thereof;
   a drive sprocket mounted intermediately between said axle assemblies;
   primary drive means interconnecting said engine with said drive sprocket for transferring torque thereto;
   a pair of driven sprockets each associated with a respective axle assembly for driving the wheel mounted thereon, and the drive sprocket being interconnected with said driven sprockets;
   an idler sprocket spaced between the respective driven sprockets;
   a single endless drive chain for transmitting the torque of said drive sprocket to the driven sprockets and axle assemblies associated therewith, to drive the wheels mounted thereon, said single drive chain being trained around the driven and said drive sprockets and being back wrapped around said idler sprocket;
   and a means mounted on said chain case comprised of two flat plates, interconnected so as to move relative to each other and which are operatively connected to said idler sprocket for adjusting the tension of the single drive chain.

2. In a vehicle, as described in claim 1, wherein said plates contain a U-shaped slot through which a securing means passes to retain the plates in relative position one above the other.

3. In a vehicle, as described in claim 2, wherein said securing means includes a nut and a bolt.

4. In a vehicle, as recited in claim 3, wherein said plates are variably moved in relation to each other by the use of an assembly secured to the externally mounted plate.

5. In a vehicle, as recited in claim 4, wherein said assembly includes, a draw bolt and block secured to the externally mounted plate.

6. In a vehicle, as recited in claim 1, wherein said operable connection comprises a pair of spaced apart arms located on the chain case, in which the idler sprocket is mounted, and a pair of cut-outs included in the lower plate capable of receiving and securing the arms of the idler mount.

7. In a vehicle having a main body frame, an engine mounted within said main frame, a pair of longitudinally spaced wheels on each side of said main frame, a drive system for driving each pair of longitudinally spaced wheels placed on the respective sides of said main body frame, said drive system for each pair of longitudinally spaced wheels comprising:

- a chain casing disposed about either side of said main frame;
- a pair of longitudinally spaced axle assemblies mounted within said chain casing and extending through said casing and outwardly therefrom having a wheel rotatively mounted on the outer portions thereof;
- a drive sprocket connected to the motors and mounted intermediately between said axle assemblies;
- a pair of driven sprockets each associated with a respective axle assembly for driving the wheel mounted thereon, said driven sprockets being interconnected with said drive sprocket;
- an idler sprocket mounted on an adjustable idler mount and spaced between the driven sprockets;
- an idler mount which includes a pair of arms positioned so that the idler sprocket can freely rotate therein;
- a single endless drive chain for transmitting the torque of said drive sprocket to said driven sprockets and axle assemblies associated therewith, to drive the wheels mounted thereon, said single drive chain being trained around the driven and drive sprockets and being back wrapped around said idler sprocket;
- and an adjusting mechanism mounted on the chain case, operatively connected with the idler mount to position the idler mount, and the idler sprocket contained therein, to selectively adjust the tension applied to the single chain member, and wherein said adjusting mechanism comprises;
- an upper plate disposed exteriorly of said chain case secured to a block and draw bolt assembly capable of moving said plate to various positions along the top of the chain case,
- a lower plate disposed within said chain case and directly connected to said exterior plate so any movement of the exterior plate will be imparted to said plate.
- a U-shaped slot included in the respective plates so that a nut and a bolt can pass through the said plates and keep them in proper position with respect to each other,
- and a sealable means placed between the plates and the chain casing to facilitate movement of the entire adjusting mechanism.

* * * * *